US007164676B1

(12) United States Patent
Chakraborty

(10) Patent No.: US 7,164,676 B1
(45) Date of Patent: Jan. 16, 2007

(54) METHOD AND APPARATUS FOR A COMBINED BULK AND TRANSACTIONAL DATABASE SYNCHRONOUS SCHEME

(75) Inventor: Anindya Chakraborty, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 897 days.

(21) Appl. No.: 09/813,576

(22) Filed: Mar. 21, 2001

(51) Int. Cl.
*H04L 12/50* (2006.01)

(52) U.S. Cl. .................... 370/368; 709/213; 370/392; 370/401

(58) Field of Classification Search ................ 707/201, 707/202, 203, 204
See application file for complete search history.

(56) References Cited

U.S. PATENT DOCUMENTS

| | | | |
|---|---|---|---|
| 5,621,721 A | | 4/1997 | Vatuone |
| 5,758,150 A | | 5/1998 | Bell et al. |
| 5,778,388 A | | 7/1998 | Kawamura et al. |
| 5,963,954 A | * | 10/1999 | Burrows .................. 707/102 |
| 6,205,449 B1 | * | 3/2001 | Rastogi et al. ............ 707/202 |
| 6,230,164 B1 | | 5/2001 | Rekieta et al. |
| 6,282,280 B1 | | 8/2001 | Rekieta et al. |
| 6,330,568 B1 | | 12/2001 | Boothby et al. |
| 6,421,687 B1 | * | 7/2002 | Klostermann ............. 707/202 |
| 6,789,178 B1 | * | 9/2004 | Mikkelsen et al. ........ 711/167 |

OTHER PUBLICATIONS

Clarence A. Ellis, "Consistency and Correctness of Duplicate Database Systems," Proceedings of Sixth ACM Symposium on Operating Systems Principles, Nov. 1997, pp. 67-84.

Theodore Johnson and Padmaschree Krishna, "Lazy Updates for Distributed Search Structure," Proceedings of the 1993 ACM SIGMOD International Conference on Management of Data, 1993, pp. 337-346.

* cited by examiner

*Primary Examiner*—Chau Nguyen
*Assistant Examiner*—Christopher Grey
(74) *Attorney, Agent, or Firm*—The Law Office of Kirk D. Williams

(57) ABSTRACT

Methods and apparatus are disclosed for a combined bulk and transactional database synchronization scheme. A dynamically changing primary database is initially duplicated to a secondary database using bulk and transactional updates. Then, the secondary database is maintained in synchronization with the primary database using transactional updates. In one implementation, the primary database is divided into synchronization groups. Initially, all the groups are marked as requiring bulk synchronization. Systematically, entries from a group are combined into a bulk update message and relayed to a secondary device or component to bulk update the secondary database. When a new update to the primary database is made, if the group to which it belongs is in the process of, or still requires bulk updating, this new update will be propagated to the secondary database in due course with a subsequent bulk update. Otherwise, the new update is placed in transactional update message.

20 Claims, 8 Drawing Sheets

BULK UPDATE MESSAGE

BULK UPDATE ACKNOWLEDGEMENT MESSAGE

TRANSACTIONAL UPDATE MESSAGE

METHOD AND APPARATUS FOR A COMBINED BULK AND TRANSACTIONAL DATABASE SYNCHRONOUS SCHEME

FIELD OF THE INVENTION

This the invention relates to a combined bulk and transactional database synchronous scheme; and more particularly, the invention relates to synchronizing a database of a standby controller to that of a dynamic database of an active controller of a communications system.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). Moreover, customers are demanding increased performance and high reliability.

One approach for increasing the reliability of a system is to have hot standby components available to immediately replace an active component when a failure of the active component is detected. For example, a communications switching system may employ an active controller to configure connections. The database reflecting these connections can be quite large as known switching systems may support fifty to one hundred thousand connections or more at a given time. In a typical installation, the connections are continuously being added, deleted and modified. When the active controller fails, it is desirable that a standby controller could assume the operations of the failed active controller with no or only a minimal disruption. Thus, the standby controller must have immediate access to the database reflecting the connections, such as a duplicate copy of this connection data.

One known approach to synchronize the database of an active controller with that of a standby controller is for the active controller, upon insertion or reboot of a standby controller, to enter a hold state of not allowing connection changes to the database. The database of the active controller is then duplicated in the standby controller. Subsequently, the active controller returns to the active state, accepts connection changes, and relays these connection changes to the standby controller to maintain synchronization. However, freezing the state of the active connection database until the database of the standby controller is updated is unacceptable, especially in large systems where the database is large and thus requires a significant time to duplicate, and during this time the dynamic connection requests must either be ignored or queued.

Another often used method always uses a bulk mode of update irrespective of a standby's state. However, this approach typically causes the standby controller to lag the active controller by a significant number of entries thereby causing a significant hit in traffic during a failover scenario.

Needed are new methods and systems for efficiently copying and maintaining the database state of an active controller to that of a standby controller, including those methods and systems which result in only a minimal disruption, if any, of the servicing of connection modification requests.

SUMMARY OF THE INVENTION

Systems and methods are disclosed for synchronizing a primary database with a secondary database, while the primary database may be changing during this synchronization. In one embodiment, a first database having multiple entries is maintained. A second database is also maintained. The second database is bulk updated with the plurality of entries. Prior to the completion of this bulk updating, a new transaction request is received, the first database is updated with the new transaction request, and the second database is transactional updated with the new transaction request.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
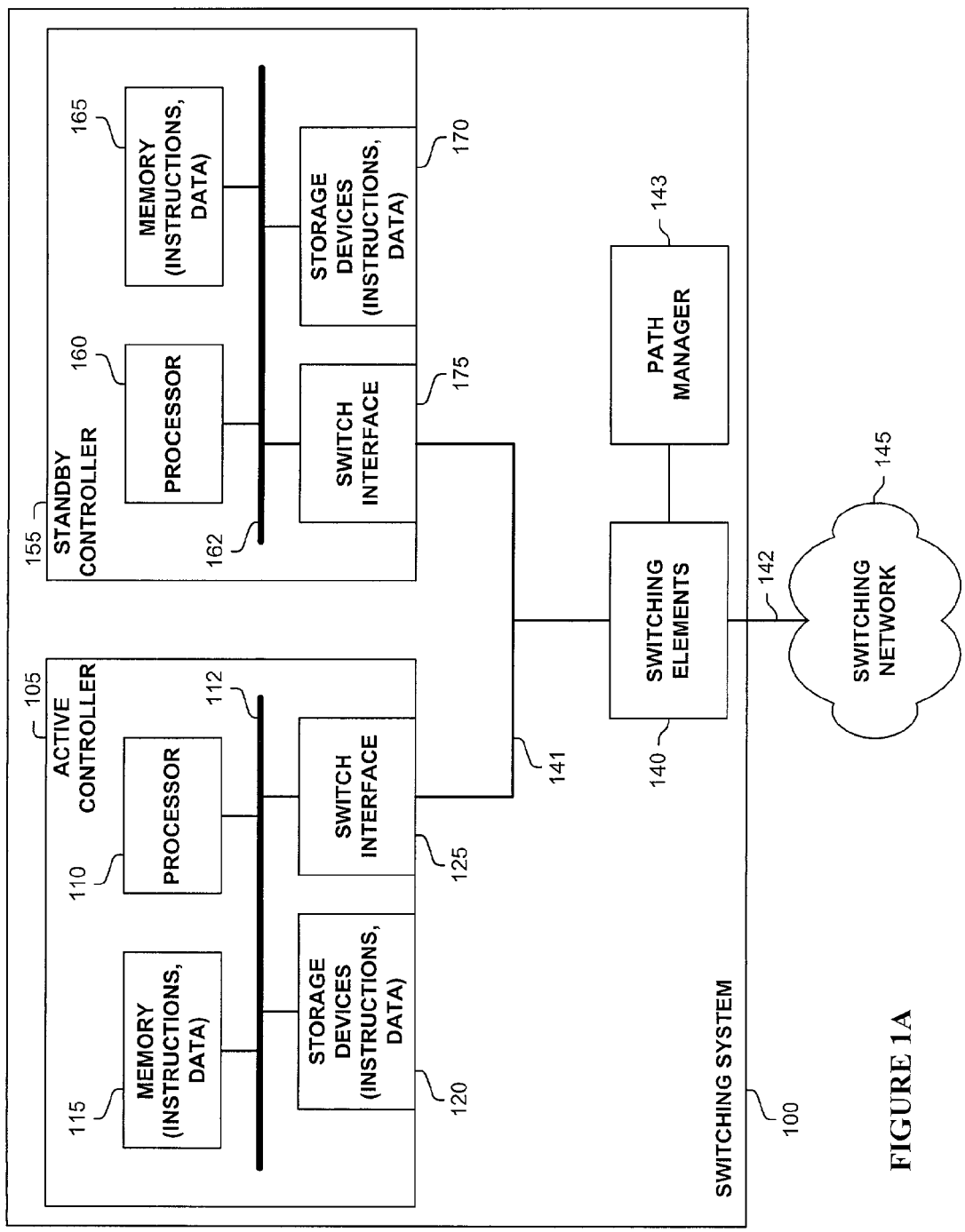
FIG. 1A is a block diagram of an exemplary embodiment and operating environment including active and standby controllers of a switching system.

Methods and apparatus are disclosed for a combined bulk and transactional database synchronization scheme which may be used, inter alia, in a computer or communications system, including, but not limited to switching systems (including routers) and other systems and devices. Although much of the description herein refers to synchronizing databases of active and standby controllers of switching systems, the invention is not limited to a single or particular communications or computer system, nor component or type of database or data structures being synchronized. Rather, the architecture and functionality taught herein are extensible to an unlimited number of computer and communications systems, devices and embodiments in keeping with the scope and spirit of the invention.

Furthermore, embodiments described herein include various elements and limitations, with no one element or limitation contemplated as being a critical element or limitation. Each of the claims individually recite an aspect of the invention in its entirety. Moreover, some embodiments described may include, but are not limited to, inter alia, systems, devices, components, elements, integrated circuit chips, embedded processors, ASICs, methods, and computer-readable medium containing instructions. The embodiments described hereinafter embody various aspects and configurations within the scope and spirit of the invention.

As used herein, the term "packet" refers to packets of all types, including, but not limited to, fixed length cells and variable length packets, each of which may or may not be divisible into smaller packets or cells. Moreover, these packets may contain one or more types of information, including, but not limited to, voice, data, video, and audio information. Furthermore, the term "system" is used generically herein to describe any number of computer and/or communication systems, devices, components, elements, mechanisms, or combinations thereof. The terms "data structure" and "database" are used interchangeably herein, and are extensible terms which refer to any mechanism for storing or maintaining information. The pronouns "first," "second," etc. are typically used herein to denote and distinguish between different particular units (e.g., a first element, a second element) and their use does not necessarily connote an ordering, such as one unit or event occurring or coming before another.

Methods and apparatus are disclosed for a combined bulk and transactional database synchronization scheme which may be used, inter alia, in a computer or communications system, including, but not limited to switching systems (including routers) and other systems and devices. A dynamically changing primary database is initially duplicated to a secondary database using bulk and transactional updates. Then, the secondary database is maintained in synchronization with the primary database using transactional updates. The initial use of bulk transaction and transactional updates rapidly converges the synchronization process into a transactional model, wherein database synchronization may be maintained by forwarding transactions received at the primary database to the secondary database. In one embodiment, the secondary database is updated using a bulk update technique during an initial or boot phase of the secondary device, after which, the secondary database is updated using a transactional update technique. In one embodiment, the secondary database is updated using a bulk update technique during a resynchronization or reconciliation phase. A reconciliation phase is typically performed automatically or in response to a command to verify synchronization and possibly resynchronize databases between active and standby controllers, and possibly switch a standby controller to become the active controller with the prior active controller becoming a standby controller or placed out of service.

In one embodiment, the primary database is divided into synchronization groups, with each group typically containing multiple entries. For example, such groupings may be achieved by hashing contents of an element or via direct indices provided in a transactional entry. Initially, all the groups are marked as requiring bulk synchronization. Systematically for each group, entries from a group are combined into a bulk update message and relayed to a secondary device or component to bulk update the secondary database. In one embodiment entries for only a single group are included in a particular bulk update message, while in one embodiment, entries from multiple groups may be included in a particular bulk update message. When a new update to the primary database is made, if the group to which it belongs is in the process of, or still requires bulk updating, this new update will be propagated to the secondary database in due course with a subsequent bulk update. Otherwise, the new update is placed in a transactional update message and forwarded to the secondary device to transactional update the secondary database. Using this technique, a primary database can be duplicated to a secondary database in a fast and efficient manner, while accommodating new updates to the primary database.

One embodiment maintains a first database with a plurality of entries and a second database. The second database is bulk updated with the plurality of entries. A new transaction request is received, and the first database is updated with the new transaction request. The second database is transactional updated with the new transaction request before the bulk updating is complete.

In one embodiment, the first database is associated with an active device and the second database is associated with a standby device. In one embodiment, the bulk updating occurs only during a booting or reconciliation phase of the standby controller. In one embodiment, the bulk updating includes sending a plurality of bulk update messages from the active device to the standby device. In one embodiment, the transactional updating includes sending a transaction update message from the active device to the standby device.

In one embodiment, the plurality of entries are grouped into a plurality of groups, and an indication of whether the second database needs updating with a particular group of the plurality of groups is maintained. In one embodiment, the first database is associated with an active device and the second database is associated with a standby device, the bulk updating includes sending a plurality of bulk update messages from the active device to the standby device, and one of the plurality of bulk update messages includes a particular plurality of the plurality of entries belonging to a single one of the plurality of groups.

In one embodiment, the first database is associated with an active device and the second database is associated with a standby device, the bulk updating includes sending a plurality of bulk update messages from the active device to the standby device, and one of the plurality of bulk update messages includes entries from at least two of the plurality of groups. In one embodiment, the first database is associated with an active controller of a switching system, and the second database is associated with a standby controller of the switching system. In one embodiment, the bulk updating occurs only during a booting or reconciliation phase of the standby controller. One embodiment maintains an indication of whether the second database needs updating with a particular entry of the plurality of entries. One embodiment receives a first and second plurality of additional transaction requests after the bulk updating has commenced, updates the first database with the first and second plurality of additional transaction requests, bulk revises the second database with the first plurality of additional transaction requests, and transactional revises the second database with the second plurality of additional transaction requests. One embodiment includes a computer-readable medium containing computer-executable instructions for performing operations associated with synchronizing the first and second databases.

One embodiment maintains a plurality of groups of entries, and an indication of which of the groups of entries are subject to a bulk update technique. A new request is received. A determination is made as to whether a particular group of entries to which the new request belongs is subject to the bulk update technique, wherein at least one entry of the group of entries remains subject to the bulk update technique. A transactional update is initiated for the new request if the particular group of entries is not subject to the bulk update technique.

One embodiment initiates a bulk update of said at least one of the group of entries remaining subject to the bulk update technique. In one embodiment, initiating the bulk update and initiating the transactional update are performed by separate threads of one or more processes. In one embodiment, initiating the bulk update and initiating the transactional update are performed by separate hardware threads. In one embodiment, initiating the bulk update for the new request includes sending a bulk update message. In one embodiment, initiating the transactional update for the new request includes sending a transactional update message. One embodiment initiates a first bulk update including the new request if the particular group of entries is subject to the bulk update technique. One embodiment initiates a second bulk update for the particular group of entries prior to said receiving the new request. One embodiment receives a transaction acknowledgement message for the particular group of entries, and updates the indication for the particular group of entries to reflect that the particular group of entries is not subject to the bulk update technique.

One embodiment receives a transaction acknowledgement message for the particular group of entries and initiates a bulk update of the particular group of entries in response to receiving the transaction acknowledgement message and determining that at least one of the entries of the particular group of entries requires synchronization. One embodiment receives a second transaction acknowledgement message for the particular group of entries, and updates the indication for the particular group of entries to reflect that the particular group of entries is not subject to the bulk update technique in response to receiving the second transaction acknowledgement message and determining that no entries of the particular group of entries requires synchronization. In one embodiment, the transactional update includes sending a transactional update message from an active controller to a standby controller. One embodiment includes a computer-readable medium containing computer-executable instructions for performing operations.

One embodiment includes: an active database comprising a plurality of entries and an indication of which of the plurality of entries require bulk synchronization; an active controller bulk updater to compose a plurality of bulk update messages including a group of the plurality of entries indicated as requiring bulk synchronization; and an active controller transactional updater to compose a plurality of transactional update messages prior to the indication indicating that none of the plurality of entries requires bulk synchronization.

One embodiment includes: means for maintaining an active database comprising a plurality of entries and an indication of which of the plurality of entries require bulk synchronization; means for composing a plurality of bulk update messages including a group of the plurality of entries indicated as requiring bulk synchronization; and means for composing a plurality of transactional update messages prior to the indication indicating that none of the plurality of entries requires bulk synchronization.

One embodiment includes an active controller and a standby controller. The active controller includes an active database comprising a plurality of entries and an indication of which of the plurality of entries require bulk synchronization; an active controller bulk updater to compose a plurality of bulk update messages including a group of the plurality of entries indicated as requiring bulk synchronization; and an active controller transactional updater to compose a plurality of transactional update messages prior to the indication indicating that none of the plurality of entries requires bulk synchronization. The standby controller includes: a second database; a standby database updater to receive the plurality of bulk update messages from the active controller, to extract the group of the plurality of entries from the received bulk update messages, and to update the second database with the plurality of entries.

In one embodiment, the standby controller further includes a standby database transactional updater to receive the plurality of transactional update messages and to update the second database. In one embodiment, the standby database updater further receives the plurality of transactional update messages and updates the second database. In one embodiment, the active controller transactional updater further comprises a second plurality of transactional update messages after the indication indicating that none of the plurality of entries requires bulk synchronization.

One embodiment includes means for maintaining a first database; means for maintaining a second database; means for performing a bulk synchronization of the first and second databases; and means performing a transactional synchronization of the first and second databases prior to completion of the bulk synchronization of the first and second databases.

One embodiment includes means for maintaining a plurality of groups of entries; means for maintaining an indication of which of the groups of entries are subject to a bulk update technique; means for receiving a new request; means for determining whether a particular group of entries to which the new request belongs is subject to the bulk update technique, wherein at least one entry of the group of entries remains subject to the bulk update technique; and means for initiating a transactional update for the new request if the particular group of entries is not subject to the bulk update technique.

FIG. 1A illustrates a block diagram of a switching system 100 which may use a combined bulk and transactional database synchronous scheme to maintain a copy of a connection or other database of an active controller 105 with that of a standby controller 155. As shown, active controller 105 and standby controller 155 are used to control, via link 141 (shown as a bus for illustrative purposes), switching elements 140 which connect to a switching or communications network 145 over link 142. In one embodiment, path manager 143 communicates with active controller 105, standby controller 155, and devices connected to switching network 145 to manage the setup and teardown of communications paths through switching elements 140 and possibly switching system 145. Path manager 143 typically has the intelligence to determine the routing of a communication path through switching system 100.

In one embodiment, active controller 105 includes processor and/or control logic 110 (hereinafter "processor"), memory 115, storage devices 120, switch interface 125, and one or more internal communications mechanisms 112 (shown as a bus for illustrative purposes). In other embodiments, active controller 105 may include custom components such as application-specific integrated circuits ("ASICs") to supplement or replace some or all of components 110–125. In one embodiment, processor 110 controls the operations of active controller 105 according to the invention. Memory 115 is one type of computer-readable medium, and typically comprises random access memory (RAM), read only memory (ROM), integrated circuits, and/or other memory components. Memory 115 typically stores computer-executable instructions to be executed by processor 110 and/or data which is manipulated by processor 110 for implementing functionality in accordance with the invention. Storage devices 120 are another type of computer-readable medium, and typically comprise disk drives, diskettes, networked services, tape drives, and other storage devices. Storage devices 120 typically store computer-executable instructions to be executed by processor 110 and/or data which is manipulated by processor 110 for implementing functionality in accordance with the invention.

As used herein, computer-readable medium is an extensible term including other memory and other storage devices and/or mechanisms.

Standby controller 155 includes processor and/or control logic 160 (hereinafter "processor"), memory 165, storage devices 170, switch interface 175, and one or more internal communications mechanisms 162 (shown as a bus for illustrative purposes). In other embodiments, standby controller 155 may include custom components such as application-specific integrated circuits ("ASICs") to supplement or replace some or all of components 160–175. In one embodiment, processor 160 controls the operations of standby controller 155 according to the invention. Memory 165 is one type of computer-readable medium, and typically comprises random access memory (RAM), read only memory (ROM), integrated circuits, and/or other memory components. Memory 165 typically stores computer-executable instructions to be executed by processor 160 and/or data which is manipulated by processor 160 for implementing functionality in accordance with the invention. Storage devices 170 are another type of computer-readable medium, and typically comprise disk drives, diskettes, networked services, tape drives, and other storage devices. Storage devices 170 typically store computer-executable instructions to be executed by processor 160 and/or data which is manipulated by processor 160 for implementing functionality in accordance with the invention.

Switch interfaces 125 and 175 allow bulk and transactional communication between active controller 105 and standby controller 155 (and with switching elements 140) over communications link 141. This communication typically includes packets or control signals for synchronizing an active connection database (and/or other data structures) maintained by active controller 105 in memory 115 and/or storage devices 120 with a secondary database (and/or other data structures) maintained by standby controller 155 in memory 165 and/or storage devices 170.

Figure 1B:
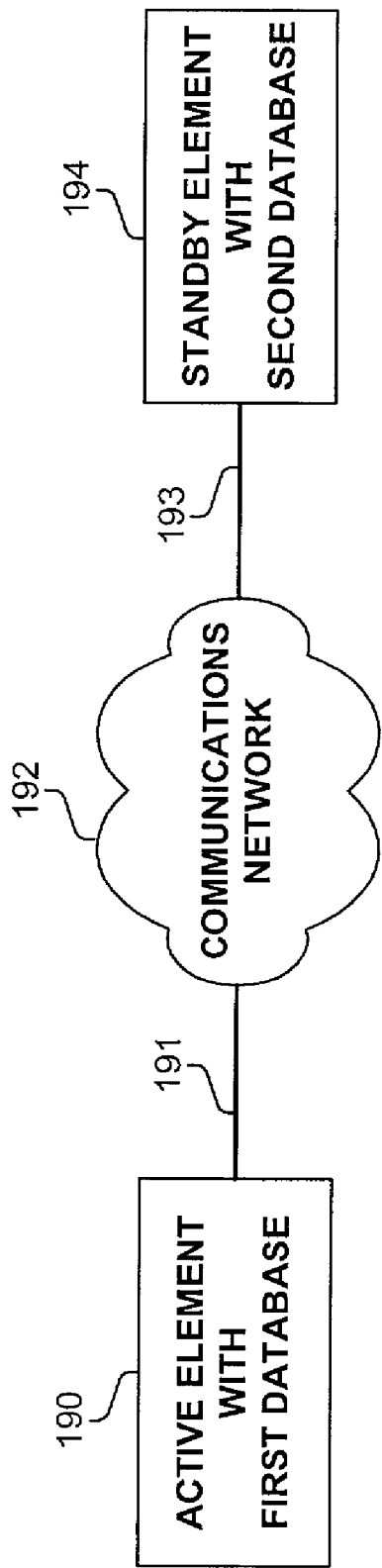
FIG. 1B is a block diagram of an embodiment including active and standby elements having databases that are synchronized across a communications network.

As indicated by FIGS. 1A–B, synchronization methods and apparatus according to the invention may be used in an unbounded number of configurations and systems. FIG. 1B illustrates a block diagram of another embodiment of the invention for synchronizing two databases using a bulk and transactional database synchronization scheme. Active element with first database 190 and standby element with second database 194 communicate bulk and transactional messages or signals over communications network 192 and links 191 and 193. In some embodiments, active element with first database 190 and standby element with second database 194 are located in separate components, devices or systems. In some embodiments, active element with first database 190 and standby element with second database 194 are implemented as part of a single computer or communications device, with communications network 192 being, for example, but not limited to a data bus or some other internal information sharing mechanism such as message passing or shared memory.

Figure 2:
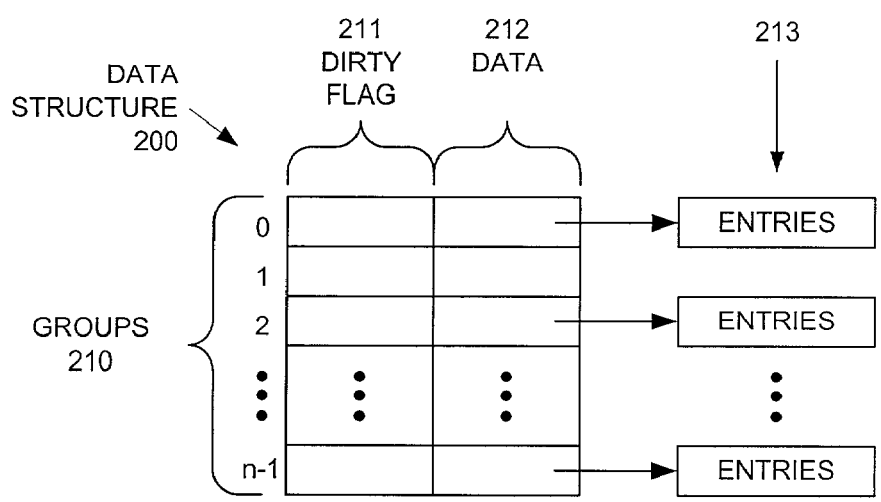
FIG. 2 is a block diagram of a data structure used in one embodiment for synchronizing databases.

FIG. 2 illustrates one data structure 200 used in one embodiment of a bulk and transactional database synchronization scheme according to the invention. In one embodiment, the primary database is divided into synchronization groups 210 of zero or more entries or transactions (hereafter "entries") 213. Entries 213 may each contain a plurality of data elements to be synchronized, which may be maintained in any data structure, such as a linked list, array, set, load balanced tree, etc. In one embodiment, the particular entries within a plurality of entries 213 are maintained in a sorted order. In one embodiment, each of the entries 213 contain a dirty flag (e.g., a bit) which may be used to indicate whether a particular entry 213 requires synchronization or has been synchronized with another database. Groups 210 may be divided in most any way, such as that using a hashing function or based on a value of a location, address, connection identifier, etc.

Initially, all the groups 210 are marked as requiring bulk synchronization. Systematically, multiple entries 213 from one or more groups 210 are combined into a bulk update message and relayed to a secondary device or component to bulk update the secondary database. In one embodiment, data structure 200 includes a dirty flag field 211 to indicate whether a particular group 210 is subject to a bulk update technique. In one embodiment, data structure 200 includes a data field 212 which may reference or include entries 213 (e.g., connections, other data) of the actual data being synchronized within each particular group 210 of the multiple groups 210. In one embodiment, each entry 213 includes an entry dirty flag to indicate whether or not it is subject to a bulk update.

Figure 3A:
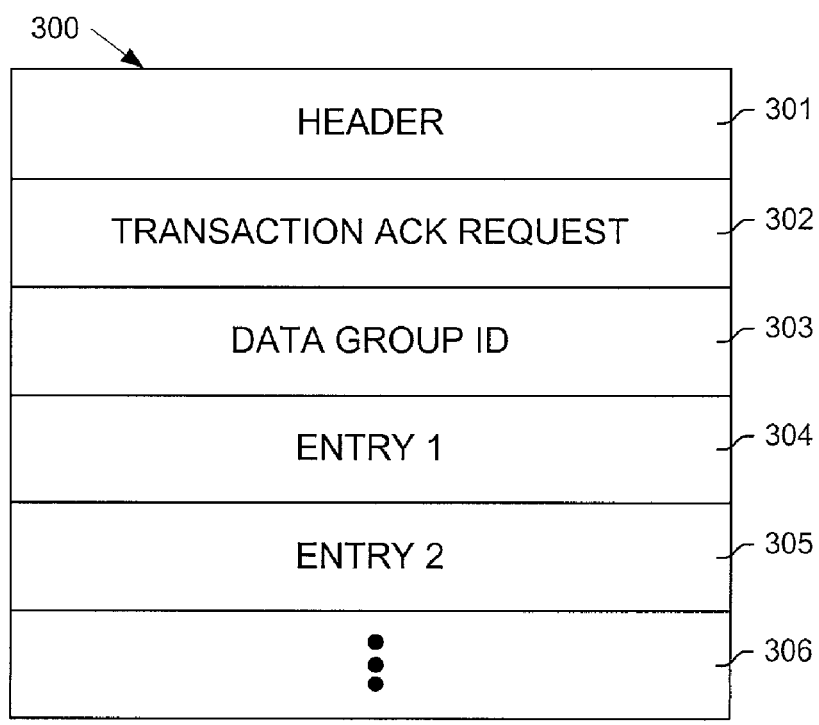
FIGS. 3A–C are exemplary formats of messages used in one embodiment for synchronizing databases.

FIG. 3A illustrates one embodiment of a bulk update message 300. A bulk update message refers to any mechanism which can be used to communicate multiple entries between two databases or data structures. Typically, bulk update messages are used to systematically communicate groups of entries contained in a first database or data structure, rather than to communicate entries in real-time as they are received. In one embodiment, bulk update message bulk update message sent, for example, from an active controller to a standby controller of a switching system or router. Message format 300 includes a header field 301, transaction acknowledgement request field 302 typically used to request an acknowledgement from the standby controller, entry fields 304–306 corresponding to the data being synchronized, and a data group identifier field 303 to indicate to which group entries 304–306 belong.

Figure 3B:
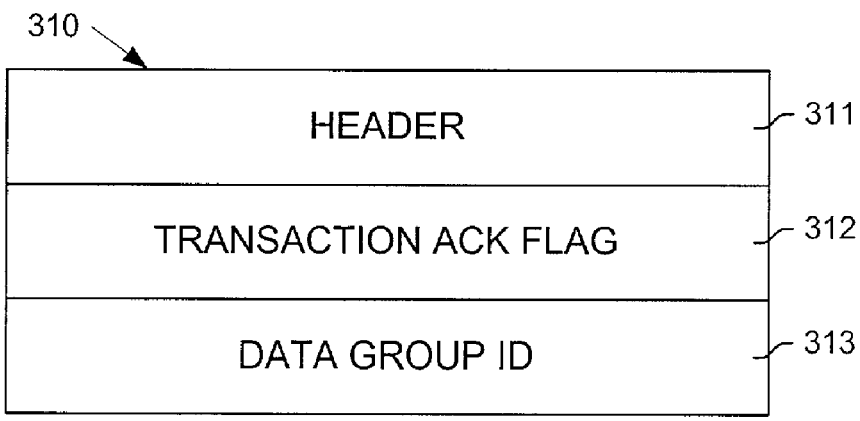

FIG. 3B illustrates one embodiment of a bulk update acknowledgement message 310 sent, for example, from a standby controller to an active controller to acknowledge receipt of a bulk update message 300 (FIG. 3A) and/or updating of its data structure. As shown, bulk update acknowledgement message 310 includes a header field bulk update), then processing proceeds to process block 410 where a set of entries are retrieved from one of the dirty groups and the dirty indicators for the selected entries are reset. In one embodiment, entries within a set of entries are maintained in a sorted order or using another data structure to make the step of getting more entries more efficient. Next, if all remaining entries to be bulk updated from the particular group have not been selected as determined in process block 412, then the entries are put into a bulk update message and the message being sent to the standby component in process block 414, and processing returns to process block 406 to process more dirty entries and groups. Otherwise, in process block 416, the transaction acknowledgement field of the bulk update message for the selected entries is set in process block 416, and the bulk update message is sent to the standby component in process block 418. Next, in process block 420, the process waits until it receives a transaction acknowledgement message from the standby component. In another embodiment, a separate process thread is used to receive the transaction acknowledgement messages. If, as determined in process block 422, there remains a dirty element in the group for which the transaction acknowledgement message was received in process block 420, processing returns to process block 406 to process more dirty entries and groups. Otherwise, the group dirty flag is reset for the group for which the transaction acknowledgement message was received in process block 420 and processing returns to process block 406 to check to see if there are more dirty groups to process. When there are no more dirty groups as determined in process block 406, then the bulk updating is finished as indicated by process block 408.

Figure 4A:
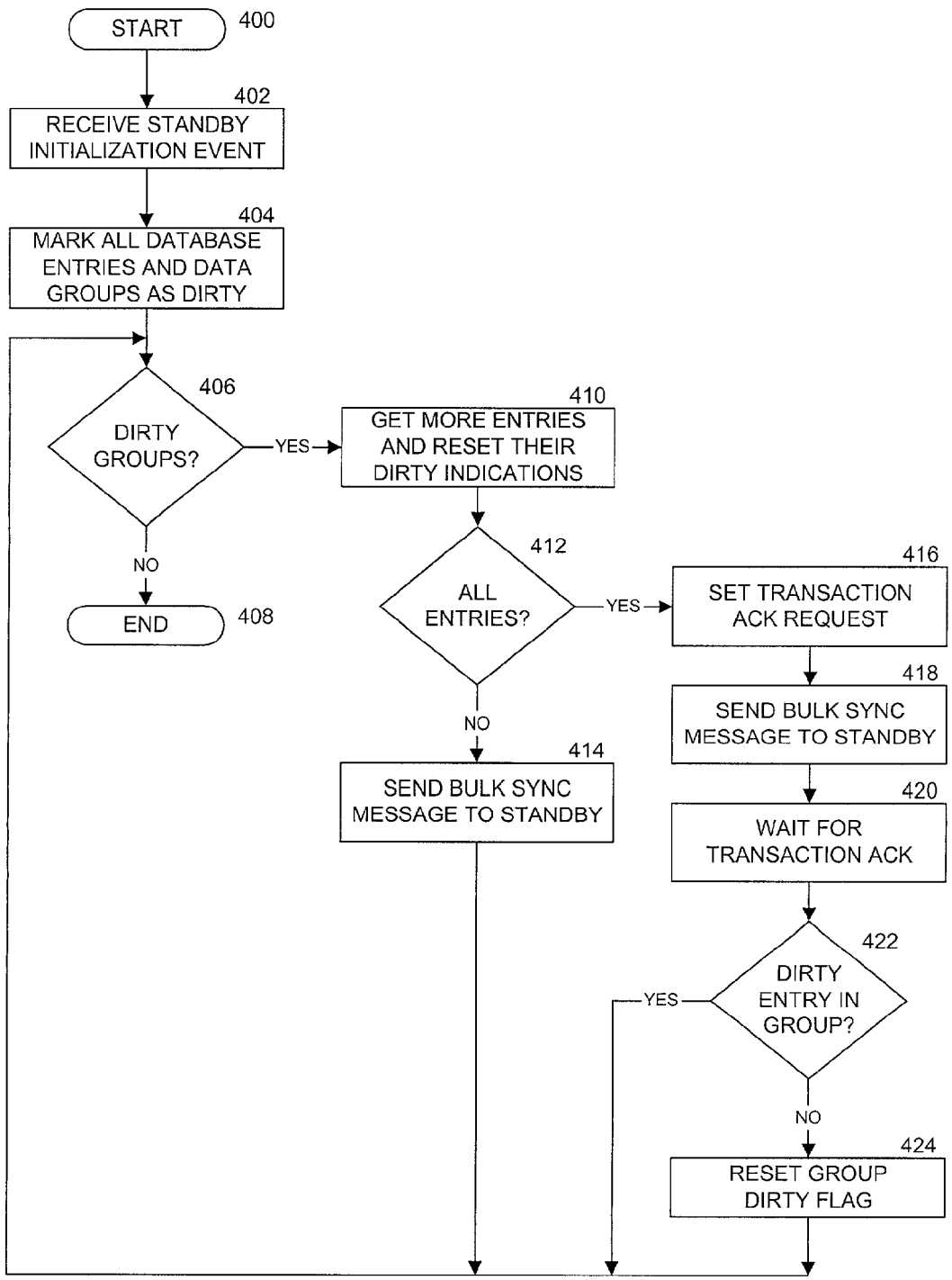
FIG. 4A is a flow diagram illustrating one embodiment of a process for bulk updating a standby database with entries in an active database.
Figure 4B:
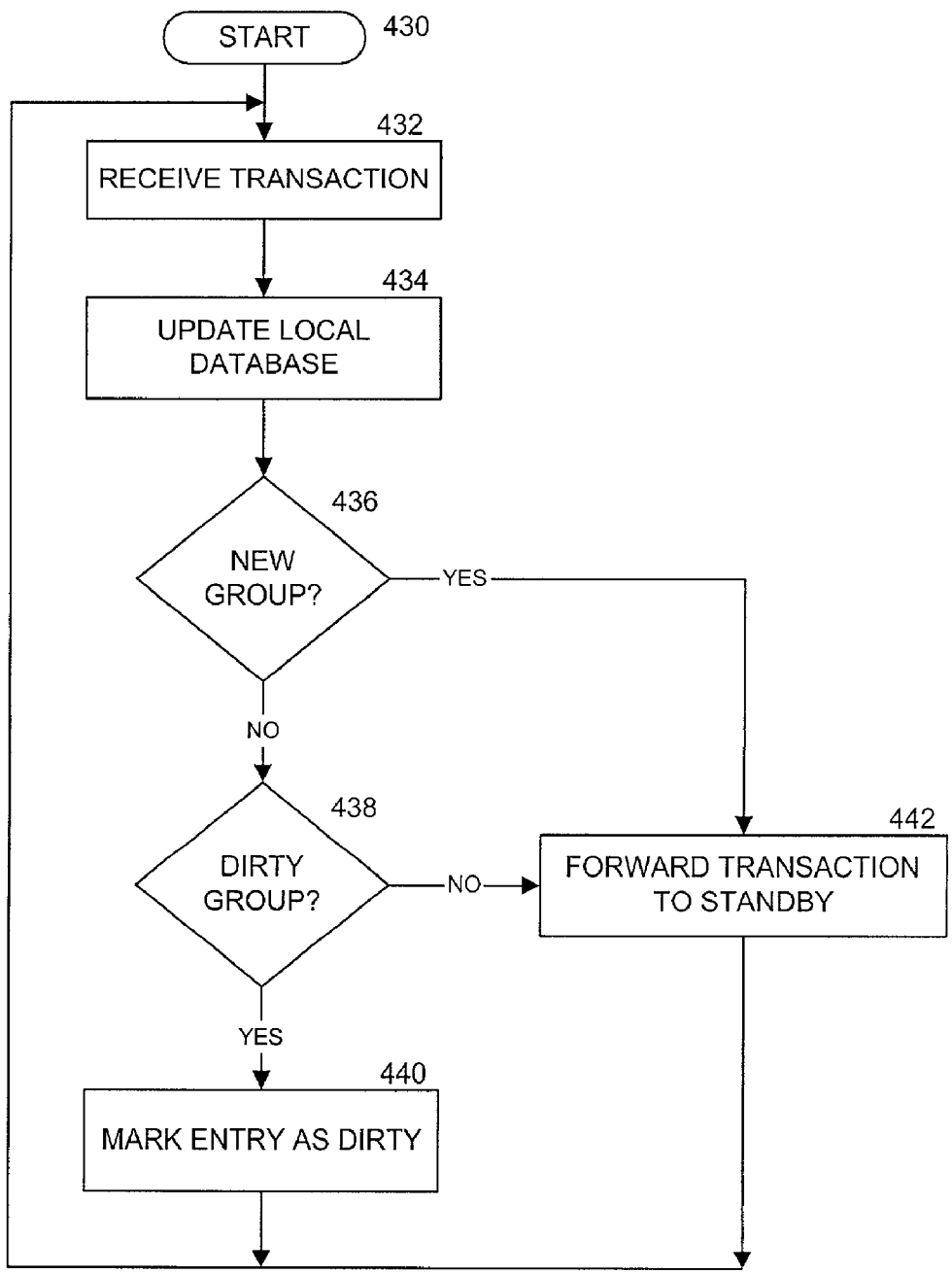
FIG. 4B is a flow diagram illustrating one embodiment of a process for updating an active database with a received database transaction, and transactional updating a standby database with the received database transaction.

FIG. 4B illustrates one embodiment of a process of an active component for receiving and handling a new transaction (e.g., a connection update or other primary database update, etc.). Processing begins at process block 430, and proceeds to process block 432 wherein the transaction request is received from another element, component, system, etc. The local database of the active controller is updated with the new transaction request in process block 434. In one embodiment, new entries and possibly new groups may be created and added to the local database. Next, if the transaction 311, a transaction acknowledgement flag field 312 to indicate the acknowledgment, and a data group identifier field 313 to indicate to which group the acknowledgement refers. In one embodiment, a bulk update acknowledgement message 310 is used to inform the active controller that the standby controller has acted upon all entries in a group sent so far, thus eliminating ordering issues and providing an orderly transition of the active controller from a bulk update mode to a transactional update mode for the group or groups specified in data group identifier field 313.

Figure 3C:
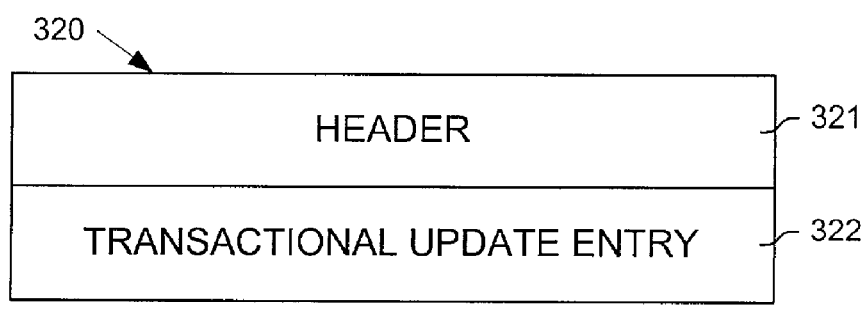

FIG. 3C illustrates one embodiment of a transactional update message 320 sent, for example, from the path manager to an active controller or from an active controller to a standby controller. A transactional update message refers to any mechanism which can be used to communicate typically one, but also multiple entries in real-time or almost real-time, and are typically used during a transactional synchronization mode. For example, shortly after updating its database with an transaction, an active controller may send to a standby controller the transaction using a transactional update message 320. In one embodiment, transactional update message 320 includes a header field 321 and a transactional update entry field 322. In one embodiment, a transactional update message contains either one or more than one transactional update entry with the entries of a message being from the same or different groups.

Figure 5:
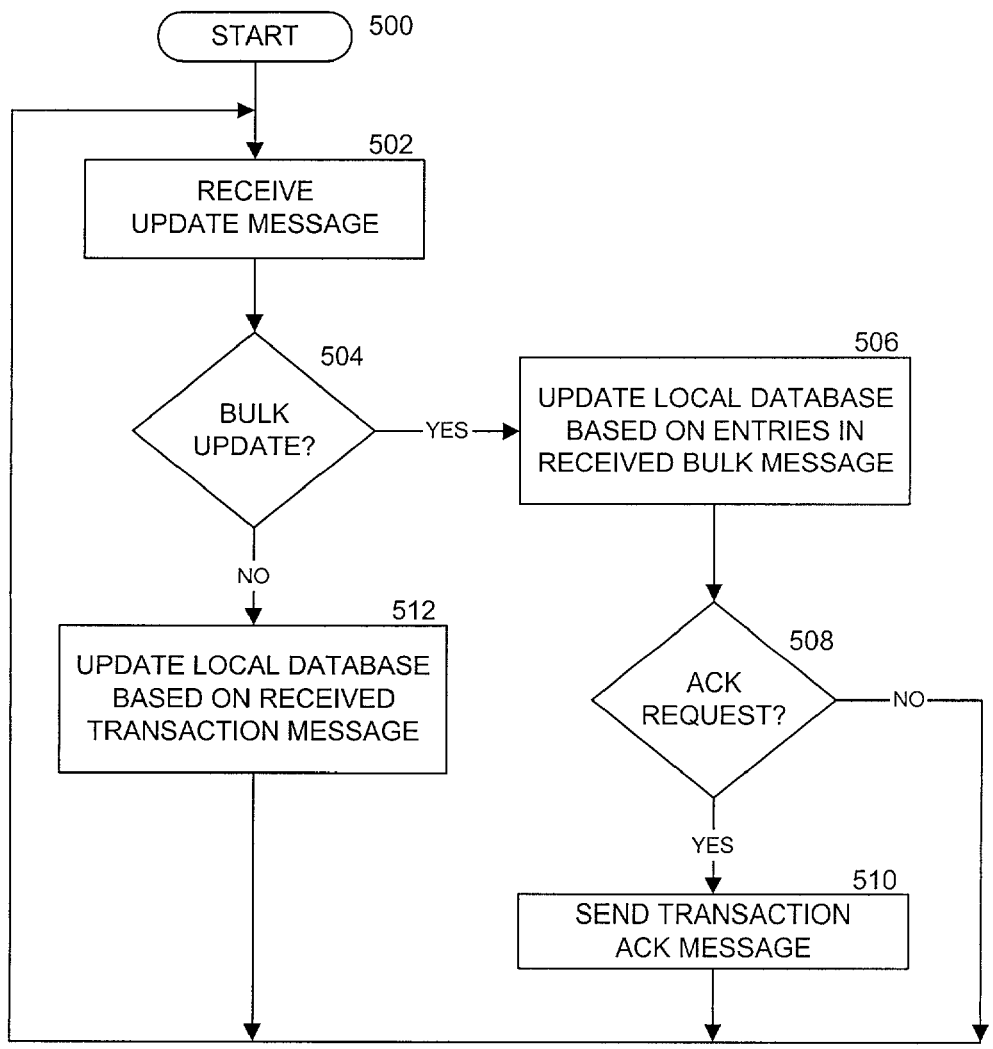
FIG. 5 is a flow diagram illustrating one embodiment of a process for updating a standby database based on received bulk and transactional update messages.

The operation of one embodiment of a system using a combined bulk and transactional database synchronization scheme is further illustrated by the flow diagrams of FIGS. 4A–B and 5. The operations illustrated in FIGS. 4A–B and 5 typically operate in parallel, and may be embodied by numerous implementation including being performed by separate hardware threads or separate threads of one or more processes.

FIG. 4A illustrates one embodiment of a process of an active component bulk updating a standby component. Process begins at process block 400, and proceeds to process block 402 where a standby initialization event is received or recognized to indicate that a bulk update is required. Next, in process block 404, all database entries and groups are marked as dirty to indicate that they are subject to a bulk update process. Next, as determined in process block 406, while groups remain dirty (i.e., are subject to a request belongs to a new bulk update group as determined in process block 436, then the standby database will be transactional updated in process block 442 with the new transaction request (rather than as part of a bulk update). Otherwise, if the group to which the new transaction request is not dirty as determined in process block 438, the standby database will be transactional updated in process block 442 with the new transaction request. Otherwise, the entry previously added to the local database in process block 432 (and corresponding to the received transaction request) is marked as dirty in process block 440 (and the standby database will be bulk updated with this entry). Processing returns to process block 432 to receive and process more transactions.

FIG. 5 illustrates one embodiment of a process of a standby component for receiving bulk and transactional updates from an active component and updating its database. Processing begins at process block 500, and proceeds to process block 502 wherein an update message is received from an active component. Next, if the message corresponds to a bulk update as determined in process block 504, then the local database of the standby component is updated with the entries included in the received bulk update message in process block 506. If an acknowledgement was requested in the received bulk update message as determined in process block 508, then a transaction acknowledgment message is sent to the active component in process block 510. Otherwise, if the message corresponds to a transactional update as determined in process block 504, then the local database of the standby component is updated with the entry or entries included in the received transactional update message in process block 512. Processing returns to process block 502 to receive and process more update messages.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for duplicating a plurality of entries of a first database to a second database and maintaining said entries in synchronization between the first database and second database using a combined bulk and transactional update scheme, wherein bulk updating refers to the initial updating of the second database with sets of multiple entries from the first database and transactional updating refers to the updating of entries as they are applied to the first database to the second database for entries that are no longer subject to said initial bulk updating, wherein said updating of the second database includes committing the entry or entries to the second database; the method comprising:

initializing each of a plurality of groups of said entries as requiring bulk updating prior to commencing updating of the second database with said entries, wherein, at least one of said groups of entries includes a plurality of said entries, and each of said entries are included in one of said groups; wherein said groups are associated with indications identifying which groups still require said bulk updating; wherein said initializing includes initializing said indications to identify that all of the groups of entries still require said bulk updating; and after said initializing, systematically bulk updating entries from each of the plurality of groups until all groups are identified as no longer requiring said bulk updating; wherein said indications are updated to reflect which groups still require said bulk updating; and receiving a new request prior to said identification that all groups no longer require bulk updating, and in response: updating the first database based on the new request, and determining whether or not a particular group of entries of said groups of entries to which said new request corresponds still requires bulk updating in order to determine whether to transactional update the second database with the new request or to allow said systematic bulk updating to update the second database with the new request.

2. The method of claim 1, wherein the first database is associated with an active device and the second database is associated with a standby device.

3. The method of claim 2, wherein said bulk updating occurs only during a booting or reconciliation phase of the standby controller.

4. The method of claim 2, wherein the bulk updating includes sending a plurality of bulk update messages from the active device to the standby device.

5. The method of claim 2, wherein the transactional updating includes sending a transaction update message from the active device to the standby device.

6. The method of claim 1, wherein the first database is associated with an active device and the second database is associated with a standby device; the bulk updating includes sending a plurality of bulk update messages from the active device to the standby device; and one of the plurality of bulk update messages includes a particular plurality of the plurality of entries belonging to a single one of the plurality of groups.

7. The method of claim 1, wherein the first database is associated with an active device and the second database is associated with a standby device; the bulk updating includes sending a plurality of bulk update messages from the active device to the standby device; and one of the plurality of bulk update messages includes entries from at least two of the plurality of groups.

8. The method of claim 1, wherein the first database is associated with an active controller of a switching system, and the second database is associated with a standby controller of the switching system.

9. The method of claim 8, wherein said bulk updating occurs only during a booting or reconciliation phase of the standby controller.

10. The method of claim 1, further including maintaining an indication of whether the second database needs updating with a particular entry of the plurality of entries.

11. The method of claim 1, further comprising receiving a transaction acknowledgement message for the particular group of entries; and updating the indication for the particular group of entries to reflect that the particular group of entries is not subject to the bulk update technique.

12. The method of claim 1, wherein the particular group of entries is subject to the bulk update technique if at least one entry of the particular group of entries remains subject to the bulk update technique.

13. One or more computer-readable media containing computer-executable instructions for performing operations for duplicating a plurality of entries of a first database to a second database and maintaining said entries in synchronization between the first database and second database using a combined bulk and transactional update scheme, wherein bulk updating refers to the initial updating of the second database with sets of multiple entries from the first database and transactional updating refers to the updating of entries as they are applied to the first database to the second database for entries that are no longer subject to said initial bulk updating, wherein said updating of the second database includes committing the entry or entries to the second database; said operations comprising:

initializing each of a plurality of groups of said entries as requiring bulk updating prior to commencing updating of the second database with said entries, wherein, at least one of said groups of entries includes a plurality of said entries, and each of said entries are included in one of said groups; wherein said groups are associated with indications identifying which groups still require said bulk updating; wherein said initializing includes initializing said indications to identify that all of the groups of entries still require said bulk updating; and after said initializing, systematically bulk updating entries from each of the plurality of groups until all groups are identified as no longer requiring said bulk updating; wherein said indications are updated to reflect which groups still require said bulk updating; and receiving a new request prior to said identification that all groups no longer require bulk updating, and in response: updating the first database based on the new request, and determining whether or not a particular group of entries of said groups of entries to which said new request corresponds still requires bulk updating in order to determine whether to transactional update the second database with the new request or to allow said systematic bulk updating to update the second database with the new request.

14. The computer-readable media of claim 13, wherein said operations further comprise updating the indication for the particular group of entries to reflect that the particular group of entries is not subject to the bulk update technique in response to receiving a transaction acknowledgement message for the particular group of entries.

15. A system for duplicating a plurality of entries of an active database to a second database and maintaining said entries in synchronization between the active database and second database using a combined bulk and transactional synchronization scheme, wherein bulk synchronization refers to the initial updating of the second database with sets of multiple entries from the active database and transactional synchronization refers to the updating of entries as they are applied to the active database to the second database for entries that are no longer subject to said initial bulk synchronization, wherein said updating of the second database includes committing the entry or entries to the second database, the system comprising:

an active controller including:

the active database further comprising an indication of which of the plurality of entries require bulk synchronization, wherein said indication is initialized to reflect that all of said entries require bulk synchronization prior to commencement of said bulk synchronization;

an active controller bulk updater to compose a plurality of bulk update messages for communicating the plurality of entries indicated as requiring bulk synchronization to the standby controller; and an active controller transactional updater to compose a plurality of transactional update messages prior to the indication indicating that none of the plurality of entries still requires bulk synchronization;

wherein a new request received prior to identifying that none of the plurality of entries still requires bulk synchronization is forwarded to the standby controller by the active controller bulk updater if the new request corresponds to an entry identified as still requiring bulk synchronization else by the transactional updater; and a standby controller including:

a second database; and a standby database updater to receive the plurality of bulk update messages from the active controller, to extract the group of the plurality of entries from the received bulk update messages, and to update the second database with the plurality of entries.

16. The system of claim 15, wherein the standby controller further includes a standby database transactional updater to receive the plurality of transactional update messages and to update the second database.

17. The system of claim 15, wherein the standby database updater further receives the plurality of transactional update messages and updates the second database.

18. The system of claim 15, wherein the active controller transactional updater further comprises a second plurality of transactional update messages after the indication indicating that none of the plurality of entries requires bulk synchronization.

19. An apparatus including means for duplicating a plurality of entries of a first database to a second database and maintaining said entries in synchronization between the first database and second database using a combined bulk and transactional update scheme, wherein bulk updating refers to the initial updating of the second database with sets of multiple entries from the first database and transactional updating refers to the updating of entries as they are applied to the first database to the second database for entries that are no longer subject to said initial bulk updating, wherein said updating of the second database includes committing the entry or entries to the second database; wherein said means for duplicating and maintaining said entries includes:

means for initializing each of a plurality of groups of said entries as requiring bulk updating prior to commencing updating of the second database with said entries, wherein, at least one of said groups of entries includes a plurality of said entries, and each of said entries are included in one of said groups; wherein said groups are associated with indications identifying which groups still require said bulk updating; wherein said initializing includes initializing said indications to identify that all of the groups of entries still require said bulk updating;

means for systematically bulk updating entries from each of the plurality of groups until all groups are identified as no longer requiring said bulk updating; wherein said indications are updated to reflect which groups still require said bulk updating; and means for updating the first database based on a new request received prior to said identification that all groups no longer require bulk updating, said means for updating the first database based on the new request including means for determining whether or not a particular group of entries of said groups of entries to which said new request corresponds still requires bulk updating in order to determine whether to transactional update the second database with the new request or to allow said systematic bulk updating to update the second database with the new request.

20. The apparatus of claim 19, comprising means for updating said indications to reflect that a completed bulk updated particular group of said groups does not still require said bulk updating in response to is not subject to the bulk update technique in response to receiving a transaction acknowledgement message for the completed bulk updated particular group.

* * * * *

UNITED STATES PATENT AND TRADEMARK OFFICE
CERTIFICATE OF CORRECTION

PATENT NO. : 7,164,676 B1 Page 1 of 1
APPLICATION NO. : 09/813576
DATED : January 16, 2007
INVENTOR(S) : Chakraborty It is certified that error appears in the above-identified patent and that said Letters Patent is hereby corrected as shown below:

Column 8, lines 46-67 through Column 9, lines 1-22, text beginning "bulk update)," through text ending "if the transaction" should be inserted in Column 9, line 65 between "a" and "request"

Signed and Sealed this

Eighteenth Day of September, 2007

JON W. DUDAS
*Director of the United States Patent and Trademark Office*